Figure 1:
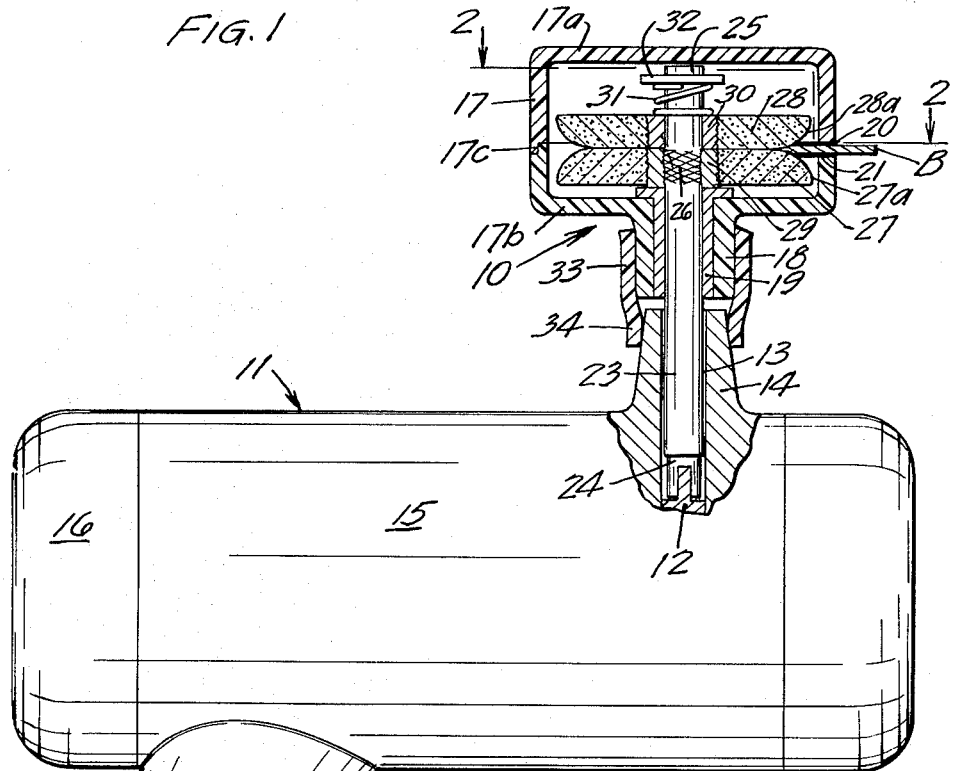

Dec. 30, 1958     A. M. GUNDERSON     2,866,303

KNIFE SHARPENING ATTACHMENT

Filed April 4, 1956

INVENTOR.
ARTHUR M. GUNDERSON
BY
Williamson, Schroeder, Adams & Meyers
ATTORNEYS United States Patent Office 2,866,303
Patented Dec. 30, 1958

2,866,303

KNIFE SHARPENING ATTACHMENT

Arthur M. Gunderson, Minneapolis, Minn., assignor, by mesne assignments, to Disney Products, Inc., Chicago, Ill., a corporation of Illinois Application April 4, 1956, Serial No. 576,185

1 Claim. (Cl. 51—241)

This invention relates to rotary knife sharpeners and more specifically relates to knife sharpening attachments for multi-purpose household appliances and the like.

Although various types of rotary knife sharpeners have been well known in the past, virtually all of such sharpeners have had distinct disadvantages. One of the primary disadvantages of many sharpeners is that they have been unnecessarily complex and therefore expensive to perform the desired function of hollow grinding knife edges.

An object of my invention is to provide a new and improved rotary knife sharpening device of simple and inexpensive construction and operation so that a very inexperienced person may readily and easily sharpen a knife in an expert manner.

Another object of my invention is to provide a novel attachment for an auxiliary source of power such as a household food mixer for sharpening knives by forming a hollow ground edge thereon.

A further object of my invention is to provide an auxiliary knife sharpening attachment for household mixers and the like, which attachment may be readily and easily applied to such a mixer and be held in a stationary and non-rotatable position to facilitate the positive guiding of a knife so that it may be accurately ground and so that the knife grinding mechanism of the sharpening attachment will be positively held in driving connection with the source of rotary power provided by the mixer.

Figure 2:
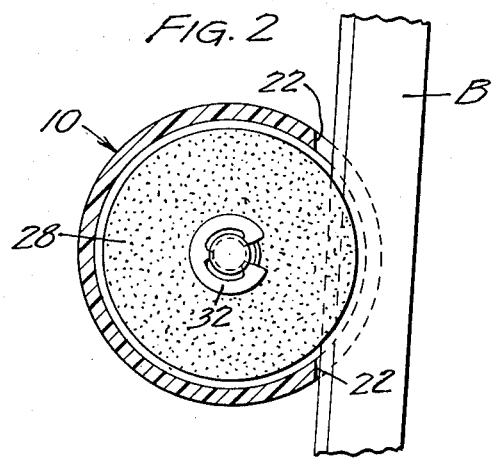

These and other objects and advantages of my invention will more fully appear from the following description made in connection with the accompanying drawings wherein like reference characters refer to similar parts throughout the several views and in which:

Fig. 1 is a longitudinal sectional view of the invention shown attached to a source of rotary power which is shown in side elevation and is partly broken away; and Fig. 2 is a detail transverse section view taken along a broken line indicated at 2—2 in Fig. 1.

One form of the invention is shown in the accompanying drawings and is described herein. The invention comprises a knife sharpening attachment indicated in general by numeral 10, which is adapted for releasable connection to a source of rotary power 11, which in the form shown, comprises a household food mixer of a conventional type having a self-contained source of power with a power output drive shaft 12 disposed in alignment with an aperture or opening 13 through a boss or projecting portion 14 of the mixer housing 15. As is conventional, the mixer 11 may have a manual control element or knob 16 at one end thereof for varying the speed of operation of the motor within the housing and of the output shaft 12. It is specifically pointed out that the disclosed arrangement of the mixer 11 is but one form of a plurality of differently styled mixers which have the essential features of the source of rotary power contained within a housing and an output power drive shaft for connection with an accessory.

The knife sharpening attachment 10 comprises a substantially cylindrical and hollow enclosure or body portion 17 which may be constructed of any suitable rigid material and in the form shown, is constructed of a well known plastic. The enclosure 17 may be formed in two cooperating portions 17a and 17b which are adhesively secured together at an interlocking joint 17c. A boss 18 is formed in one of the end walls of the cylindrical enclosure 17 and has a bearing 19 secured therein. The enclosure 17 also has an elongated knife-blade-receiving slot or opening 20 formed in the annular side wall thereof and lying in a plane which is disposed substantially transversely of the cylindrical enclosure and the axis thereof. The slot 20 defines a pair of elongated knife-guiding edges 21 which are disposed in spaced and opposed relation with respect to each other. The slot 20 also defines a pair of arcuately spaced slot ends 22 over which the knife edge may be guided while sharpening.

A rotary drive shaft 23 is journalled in the bearing 19 and has a bifurcated outer end portion 24 to provide coupling means for releasable connection with the output drive shaft 12 of the rotary power source. The inner end portion 25 is disposed within the enclosure 17 and has a knurled portion 26. A pair of grinding wheels 27 and 28 are provided for sharpening the knife blade B and in the form shown, the grinding wheels 27 and 28 are provided with rounded outer peripheral surfaces 27a and 28a respectively. Wheel 27 is provided with a malleable mounting core 29 which may be constructed of lead and which is secured in a press fit to the knurled portion 26 of shaft 23. The grinding wheel 28 is also provided with a malleable or lead mounting core 30 which is non-rotatably but slidably mounted on the inner end portion 25 of shaft 23. It will be seen that the grinding wheels 27 and 28 are contiguously disposed in axial alignment and the rounded outer peripheral surfaces thereof define an inwardly convergent annular knife edge-receiving groove which is disposed in the plane of the arcuate slot 20.

Means are provided for resiliently urging the grinding wheels together and in the form shown, such means comprise a coil spring 31 mounted on the inner end portion 25 of the shaft, and a retaining ring 32 which is secured in a suitably provided groove in the shaft 23. Spring 31 bears against grinding wheel 28 and urges the same toward grinding wheel 27.

Means are provided for non-rotatably attaching the frame or enclosure 17 to the housing 15 of the rotary power source 11 and maintaining the shaft 23 in driving connection with the rotary power output shaft 12. In the form shown, such means include a mounting band or sleeve 33 which is constructed of a resiliently expandible and constrictible material such as polyethylene, and which is mounted in encircling relation with the boss 18. The mounting band or sleeve 33 has outwardly projecting portions 34 which surround the shaft 23 for engaging and wedging onto the projected portion 14 of housing 15 of the mixer 11. The inner surface of the band or sleeve 33 is of a rather sticky nature and has a high co-efficient of friction because of the inherent properties of the polyethylene. The sleeve 33 when wedged onto the projecting portion 14 of housing 15 retains the enclosure 17 in non-rotatable relation with respect to the mixer 11 and also retains the shaft 23 in driving connection with the shaft 12.

In operation, the attachment 10 may be applied to the mixer 11 substantially in the manner shown in Fig. 1 and by operation of the manual control 16 the grinding wheels 27 and 28 may be revolved at a desired speed. A knife blade will be inserted through the slot 20 and will be guided by at least one of the edges 21. As best seen in Fig. 2, the edge of the blade B may be guided on one of the slot ends 22 as the knife is moved into the inwardly convergent groove between the wheels for sharpening. After the edge of the blade B engages the grinding wheels, the convex curved surfaces of the wheels will form hollow ground or concave portions in the blade adjacent the edge. The knife blade may be urged further into the inwardly convergent annular groove and cause the grinding wheel 28 to slide very slightly away from the wheel 27 and thereby cause a finer edge to be ground on the blade. The edges 21 will continue to guide the knife blade B as the same is being ground by the wheels and the guiding edges 21 will restrict the turning of the knife blade to an absolute minimum so the grinding of the blade edge will be substantially uniform along the entire length thereof.

After the sharpening of the knife has been completed, the knife sharpening attachment may be readily and easily removed from the mixer 11 by merely lifting the enclosure off the mixer causing the mounting sleeve 33 to disengage and causing uncoupling of the shaft 23 from shaft 12.

It will be seen that I have provided a new and improved knife sharpening attachment for use with a source of rotary power such as a conventionally styled household mixer and which attachment is constructed so as to guide the knife blade for precise positioning relative to the grinding wheels and thereby cause a uniform hollow ground edge to be formed throughout the entire length of the knife blade.

It should also be apparent that I have provided for use with a conventionally styled household mixer, a novel knife-sharpening attachment which may be readily and easily non-rotatably secured to the mixer for connection to the source of power provided thereby and may also be readily and easily removed from the mixer to facilitate use of other attachments with the mixer.

It will, of course, be understood that various changes may be made in the form, details, arrangement and proportions of the parts without departing from the scope of my invention which consists of the matter shown and described herein and set forth in the appended claim.

What I claim is:

An attachment for a multipurpose household appliance having a rotary drive output disposed inwardly and downwardly of a top opening in the appliance housing, comprising a stationary and substantially cylindrical enclosure having upper and lower end walls and a substantially cylindrical upright side wall with an arcuate knife edge-receiving slot therein lying in a horizontal plane, said slot having knife-engaging ends to limit inward movement of the knife edge into the enclosure, said enclosure also having a depending external boss formed on the lower end thereof with a vertical rotary drive shaft journalled therein, said drive shaft having a downwardly protruding portion with coupling means thereon for insertion into the appliance housing and for producing driving connection with the rotary drive output and said shaft also having an upper end portion disposed within the enclosure with a pair of contiguous grinding wheels nonrotatably mounted thereon in spring pressed face-to-face partable relation, said grinding wheels having rounded peripheral portions defining outwardly convex and inwardly convergent grinding surfaces in alignment with said slot, and resilient attachment means secured on said boss and engageable in wedging relation with protruding portions of the appliance housing around the opening therein for releasably securing the enclosure to the appliance housing and presenting rotation and longitudinal movement of the enclosure.

References Cited in the file of this patent

UNITED STATES PATENTS

| | | |
|---|---|---|
| 1,415,375 | Luebben | May 9, 1922 |
| 1,558,194 | Luebben | Oct. 20, 1925 |
| 2,129,538 | Rubinstein et al. | Sept. 6, 1938 |
| 2,545,399 | Watkins | Mar. 13, 1951 |
| 2,616,231 | Murray | Nov. 4, 1952 |